US012782210B2

(12) United States Patent
Kim et al.

(10) Patent No.: US 12,782,210 B2
(45) Date of Patent: Nov. 3, 2026

(54) DUAL-MODE COAXIAL FIBER SENSOR CAPABLE OF SIMULTANEOUSLY MEASURING TEMPERATURE AND STRAIN, METHOD OF MANUFACTURING THE SAME, AND MEASUREMENT SYSTEM

(71) Applicant: Korea Advanced Institute of Science and Technology, Daejeon (KR)

(72) Inventors: Seong Su Kim, Daejeon (KR); Won Vin Kim, Daejeon (KR); Seong Yeon Park, Daejeon (KR); Seung Yoon On, Jinju-si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 245 days.

(21) Appl. No.: 18/773,684

(22) Filed: Jul. 16, 2024

(65) Prior Publication Data

US 2025/0076132 A1 Mar. 6, 2025

(30) Foreign Application Priority Data

Aug. 28, 2023 (KR) ........................ 10-2023-0112969

(51) Int. Cl.
*G01L 1/22* (2006.01)
*G01K 7/16* (2006.01)

(52) U.S. Cl.
CPC .............. *G01L 1/2287* (2013.01); *G01K 7/16* (2013.01)

(58) Field of Classification Search
CPC .. G01D 21/02; G01D 5/3538; G01D 5/35383; G01K 7/02; G01K 7/028; G01K 7/16; G01K 11/32; G01L 1/2287; G01L 1/20; G01L 1/242; D02G 3/36; D06M 10/005; D06M 15/233; D06M 15/3566; D06M 15/61; D06M 15/63; D06M 15/693
See application file for complete search history.

(56) References Cited

U.S. PATENT DOCUMENTS 9,677,967 B2 * 6/2017 Pereira .................. F16L 11/086
11,280,688 B2 * 3/2022 Kim ...................... G01L 1/2206
11,725,468 B2 * 8/2023 Varkey .................. E21B 47/135 166/77.2
2006/0090925 A1 * 5/2006 Spruell .................. H01B 7/184 156/51
2011/0232937 A1 * 9/2011 Montena ............. H01R 43/007 174/102 R
2018/0366242 A1 * 12/2018 Farrell ............... H01R 13/6584
2019/0212211 A1 * 7/2019 Spiegelberg ............. G01K 1/08
(Continued)

FOREIGN PATENT DOCUMENTS

CN 121877073 A * 4/2026
JP H10340775 A * 12/1998

OTHER PUBLICATIONS

European Search Report of European Patent Application No. 24193762.2 dated Jan. 16, 2025.

*Primary Examiner* — Octavia Hollington
(74) *Attorney, Agent, or Firm* — Revolution IP, PLLC

(57) ABSTRACT

A dual-mode coaxial fiber sensor has a structure in which a core fiber, a strain sensing layer formed on the core fiber and made of a conductive material, and a temperature sensing layer formed on the surface of the strain sensing layer and made of a conductive material are stacked, thereby simultaneously measuring a temperature and a strain using one sensor.

16 Claims, 18 Drawing Sheets

100

(56) References Cited

U.S. PATENT DOCUMENTS

| | | | |
|---|---|---|---|
| 2021/0341314 | A1 | 11/2021 | Desmarchelier et al. |
| 2021/0404892 | A1 | 12/2021 | Kim et al. |
| 2022/0404212 | A1 | 12/2022 | Pegna et al. |

* cited by examiner

DUAL-MODE COAXIAL FIBER SENSOR CAPABLE OF SIMULTANEOUSLY MEASURING TEMPERATURE AND STRAIN, METHOD OF MANUFACTURING THE SAME, AND MEASUREMENT SYSTEM

CROSS-REFERENCE TO RELATED APPLICATION

This application claims priority to and the benefit of Korean Patent Application No. 10-2023-0112969, filed on Aug. 28, 2023, the disclosure of which is incorporated herein by reference in its entirety.

BACKGROUND

1. Field of the Invention

The present disclosure relates to a dual-mode coaxial fiber sensor capable of simultaneously measuring a temperature and a strain, a method of manufacturing the same, and a measurement system.

2. Discussion of Related Art

Fiber-reinforced composite materials are new materials prepared by mixing ultra-high-strength fiber materials such as carbon fiber and polymer materials such as epoxy. Among the fiber-reinforced composite materials, carbon fiber-reinforced composite materials are very light and have high strength as compared to metal materials such as steel and aluminum that have previously been used as structural materials. Therefore, the fiber-reinforced composite materials are suitable for applications that require light weight while securing high structural strength. Therefore, research and development for applying the carbon fiber-reinforced composite materials is being actively conducted.

The carbon fiber-reinforced composite materials have been mainly used in the military and aviation fields. In particular, in the civil aviation field, the carbon fiber-reinforced composite materials have been applied to fuselages and major parts of airliners to succeed in designing lightweight structures, and an amount of use thereof is also rapidly increasing.

As the development and distribution of electric vehicles have become more active due to the recent acceleration of carbon neutrality, attempts are being made to apply the carbon fiber-reinforced composite materials not only to the aviation field but also to the exterior materials of vehicle bodies and battery packs. As a simple example, major German automakers are actively introducing the carbon fiber-reinforced composite materials to lighten vehicle bodies, and Korean companies are also using the carbon fiber-reinforced composite panels as reinforcement materials to protect electric vehicle battery packs. Like this, the number of instantiation cases is gradually increasing.

However, despite such a trend, the application of the carbon fiber-reinforced composite materials is not accelerating. One of the main reasons is because, due to the characteristics of composite materials prepared by mixing different materials such as fiber materials and polymer resins, the physical properties of a structure may change significantly according to manufacturing conditions. Therefore, the deformation that occurs during a manufacturing process should be measured using various sensors, and a manufacturing process for each part should be optimized based on the measured deformation.

Fiber Bragg grating (FBG) sensors have been commonly used to monitor existing composite material manufacturing processes. However, in order to compensate for strain errors due to temperature changes, separate sensors for measuring a temperature, such as thermocouples or encapsulated FBG sensors, are required to use optical FBG sensors for measuring a temperature.

However, commonly used sensors for measuring a temperature have an excessively large size ranging from hundreds of micrometers to several millimeters. These sensors act as defects when used as insertion types inside composite materials, which reduces the reliability of the entire structure after manufacturing.

SUMMARY OF THE INVENTION

The present disclosure is directed to providing a dual-mode coaxial fiber sensor which is capable of simultaneously measuring a temperature and a strain to compensate for a strain error due to a temperature change using a single sensor without a separate temperature measurement sensor and has a structure that does not act as a defect even when used inside a composite material as an insertion type, a method of manufacturing the same, and a measurement system.

According to an aspect of the present disclosure, there is provided a dual-mode coaxial fiber sensor including a core fiber, and a plurality of coating layers sequentially stacked on the core fiber, wherein the plurality of coating layers include a strain sensing layer formed on the core fiber and made of a conductive material, and a temperature sensing layer formed on the strain sensing layer and made of a conductive material.

The plurality of coating layers may further include an elastomer layer with which a surface of the strain sensing layer is coated, and the temperature sensing layer may be formed on the elastomer layer.

A portion of the strain sensing layer may be exposed through a slit formed in a portion of a surface of the elastomer layer to form a junction point between the strain sensing layer and the temperature sensing layer, and the dual-mode coaxial fiber sensor may have a structure capable of measuring a temperature by measuring a thermoelectric voltage generated at the junction point.

The slit may be formed using a solvent or a laser.

The slit may be formed through an intensity and a moving speed of the laser which are set such that the elastomer layer is not damaged.

The plurality of coating layers may further include an elastomer layer with which a surface of the temperature sensing layer is coated.

The plurality of coating layers may further include an elastomer layer with which a surface of the core fiber is coated, and the strain sensing layer may be formed on a surface of the elastomer layer formed on the surface of the core fiber.

According to another aspect of the present disclosure, there is provided a method of manufacturing a dual-mode coaxial fiber sensor, the method including preparing a core fiber for a dual-mode coaxial fiber sensor, coating the core fiber with a strain sensing layer made of a conductive material, coating the strain sensing layer with an elastomer layer, removing a portion of a surface of the elastomer layer to form a slit exposing a portion of the strain sensing layer, and coating the elastomer layer with a temperature sensing layer, wherein a junction point is formed between the strain sensing layer and the temperature sensing layer through the slit, and a temperature is measured through a thermoelectric voltage measured at the junction point.

The method may further include, after the coating with the temperature sensing layer, coating a surface of the temperature sensing layer with an elastomer layer.

The method may further include, between the preparing and the coating with the strain sensing layer, coating a surface of the core fiber with an elastomer layer.

The coating with the temperature sensing layer may include coating the elastomer layer with a conductive polymer solution using a dip coating method, wherein the conductive polymer solution includes at least one selected from poly(3,4-ethylenedioxythiophene) polystyrene sulfonate (PEDOT:PSS), polypyrrole (PPY), polyaniline (PANI), and a silver nanowire dispersion solution.

The forming of the slit may include removing a portion of a surface of the elastomer layer using a solvent or a laser.

The solvent may include at least one selected from ethyl alcohol, acetone, N,N-Dimethyl formamide, tetrahydrofuran, and butanone.

The laser may include at least one selected from a $CO^2$ laser, a neodymium (Nd) laser, and a neodymium yttrium-aluminum-garnet (Nd:YAG) laser.

The forming of the slit may include forming the slit by adjusting a cutter intensity of the laser and a moving velocity of a laser head.

According to still another aspect of the present disclosure, there is provided a measurement system including a dual-mode coaxial fiber sensor in which a core fiber, a strain sensing layer, an elastomer layer, and a temperature sensing layer are sequentially stacked and in which a portion of the surface of the elastomer layer is removed to form a slit exposing a portion of the strain sensing layer, a strain measurement unit connected to the strain sensing layer and configured to measure a resistance change according to deformation of the strain sensing layer, and a temperature measurement unit which is connected to the temperature sensing layer, when a temperature change occurs in the temperature sensing layer, measures a thermoelectric voltage generated at a junction point in the slit between the temperature sensing and the strain sensing layer due to a temperature difference between the temperature sensing layer and the strain sensing layer, and measures a temperature from the thermoelectric voltage.

The measurement system may further include a first electrode and a second electrode, each having one end connected to the strain sensing layer and the other end connected to the strain measurement unit, and the strain measurement unit may measure resistance between the first electrode and the second electrode and may measure a strain from the measured resistance.

The measurement system may further include a third electrode having one end connected to the temperature sensing layer and the other end connected to the temperature measurement unit, and the temperature measurement unit may be connected to the second electrode and the third electrode, and when a temperature of the temperature sensing layer changes, may measure a voltage generated at the junction point due to a temperature difference between the temperature sensing layer and the strain sensing layer through the second electrode and the third electrode.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
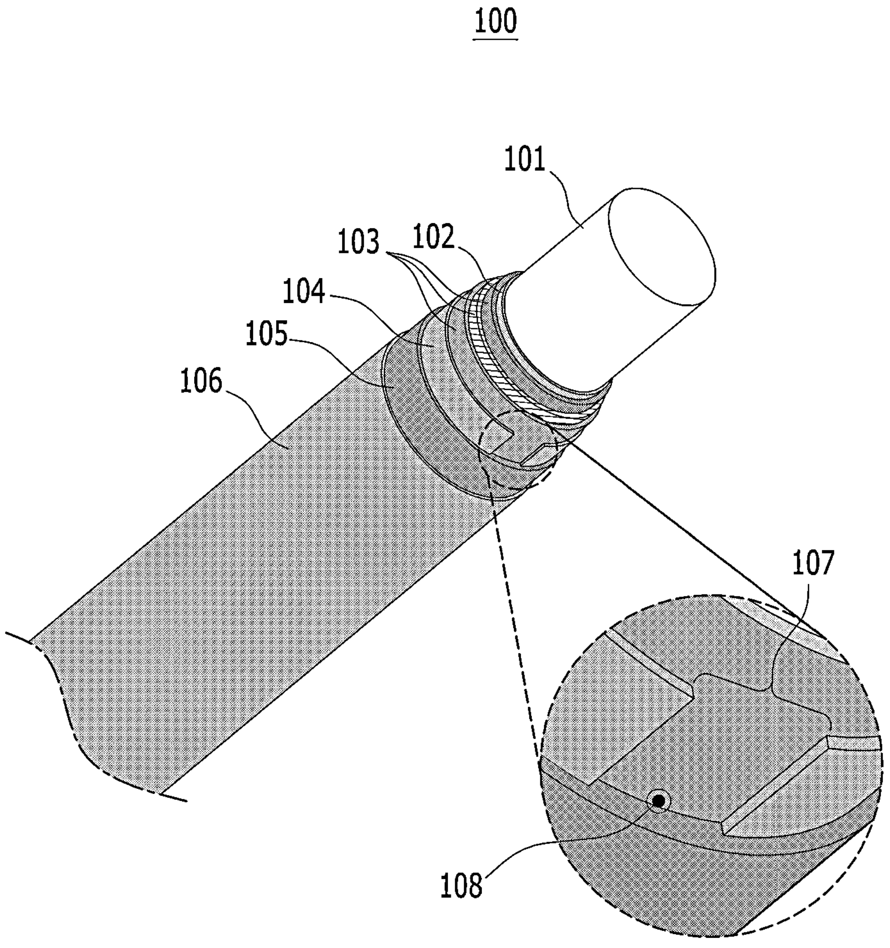
FIG. 1 is an exploded perspective view of a structure of a dual-mode coaxial fiber sensor according to an embodiment.

Hereinafter, embodiments of the present disclosure will be described in detail with reference to the accompanying drawings so that those skilled in the art may easily practice the present disclosure. However, the present disclosure may be implemented in various forms and is not limited to the embodiments described herein. In order to clearly describe the present disclosure in the drawings, parts not related to the description are omitted, and similar parts are given similar reference numerals throughout the specification.

Throughout the specification, unless explicitly described to the contrary, the word "comprise" and variations such as "comprises" or "comprising" will be understood to imply the inclusion of stated elements but not the exclusion of any other elements.

As used herein, a singular form may be intended to include a plural form as well, unless the explicit expression such as "one" or "single" is used.

In the present specification, like reference numerals denote like components irrespective of the drawings, and "and/or" includes each and all combinations of one or more of the described components.

The terms including the ordinal number such as "first" and "second" may be used to describe various components, but are not limited by the terms. The above terms are used only for distinguishing one constituent element from other constituent elements. For example, a first component may be referred to as a second component, and similarly, the second component may be referred to as the first component within the scope of the present disclosure.

In the flowchart described with reference to drawings in the present specification, the operation order may be changed, several operations may be merged, certain operations may be divided, and specific operations may not be performed.

Figure 2:
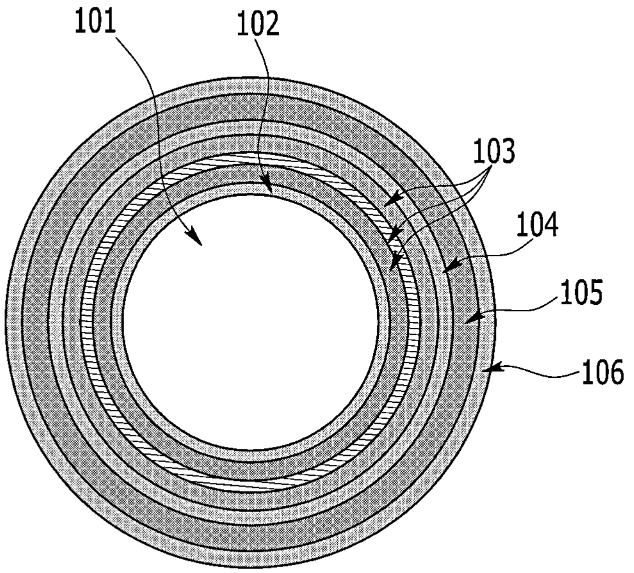
FIG. 2 is an exploded side view of the dual-mode coaxial fiber sensor of FIG. 1.

FIG. 1 is an exploded perspective view of a structure of a dual-mode coaxial fiber sensor according to an embodiment. FIG. 2 is an exploded side view of the dual-mode coaxial fiber sensor of FIG. 1.

Referring to FIGS. 1 and 2, a dual-mode coaxial fiber sensor 100 is a dual-mode sensor having a temperature measurement mode and a strain measurement mode and has a structure capable of simultaneously measuring a temperature and a strain.

The dual-mode coaxial fiber sensor 100 has a structure in which a core fiber 101, a first elastomer layer 102, a strain sensing layer 103, a second elastomer layer 104, a temperature sensing layer 105, and a third elastomer layer 106 are sequentially stacked.

Referring to FIG. 2, the dual-mode coaxial fiber sensor 100 has a structure in which the core fiber 101 is positioned at the innermost side, and the first elastomer layer 102, the strain sensing layer 103, the second elastomer layer 104, the temperature sensing layer 105, and the third elastomer layer 106 are stacked toward an outmost layer to surround the inside.

The core fiber 101 is positioned at the innermost side of the dual-mode coaxial fiber sensor 100.

The core fiber 101 may be made of a polymer material with high strength and rigidity. For example, the core fiber 101 may be made of ultra-high-molecular-weight polyethylene (UHMWPE)-based material.

A surface of the core fiber 101 is coated with the first elastomer layer 102.

The strain sensing layer 103 may be formed on a surface of the first elastomer layer 102 and may be a conductive layer with a multi-layer structure, that is, a multi-conductive layer. For example, the strain sensing layer 103 may have a structure in which three layers are stacked.

According to one embodiment, the multi-conductive layer may be manufactured by stacking layers with different concentrations of conductive particles.

According to another embodiment, the multi-conductive layer may be manufactured by stacking layers using different conductive particles, for example, graphene or carbon nanotubes (CNTs).

A surface of the strain sensing layer 103 is coated with the second elastomer layer 104.

A surface of the second elastomer layer 104 is coated with the temperature sensing layer 105 for measuring a thermoelectric voltage. The temperature sensing layer 105 may be a conductive polymer layer.

A surface of the temperature sensing layer 105 is coated with the third elastomer layer 106.

In this way, the dual-mode coaxial fiber sensor 100 has a coaxial structure including a plurality of coating layers formed through a dip coating method.

The dual-mode coaxial fiber sensor 100 has a three-layer elastomer structure surrounding the strain sensing layer 103 and the temperature sensing layer 105.

Here, a slit 107 processed using a solvent or a laser is formed in a portion of the second elastomer layer 104, and the strain sensing layer 103 is exposed through the slit 107. A junction point 108 at which the strain sensing layer 103 and the temperature sensing layer 105 meet is formed in the slit 107.

Temperature measurement is possible by measuring a thermoelectric voltage generated at the junction point 108.

Figure 3:
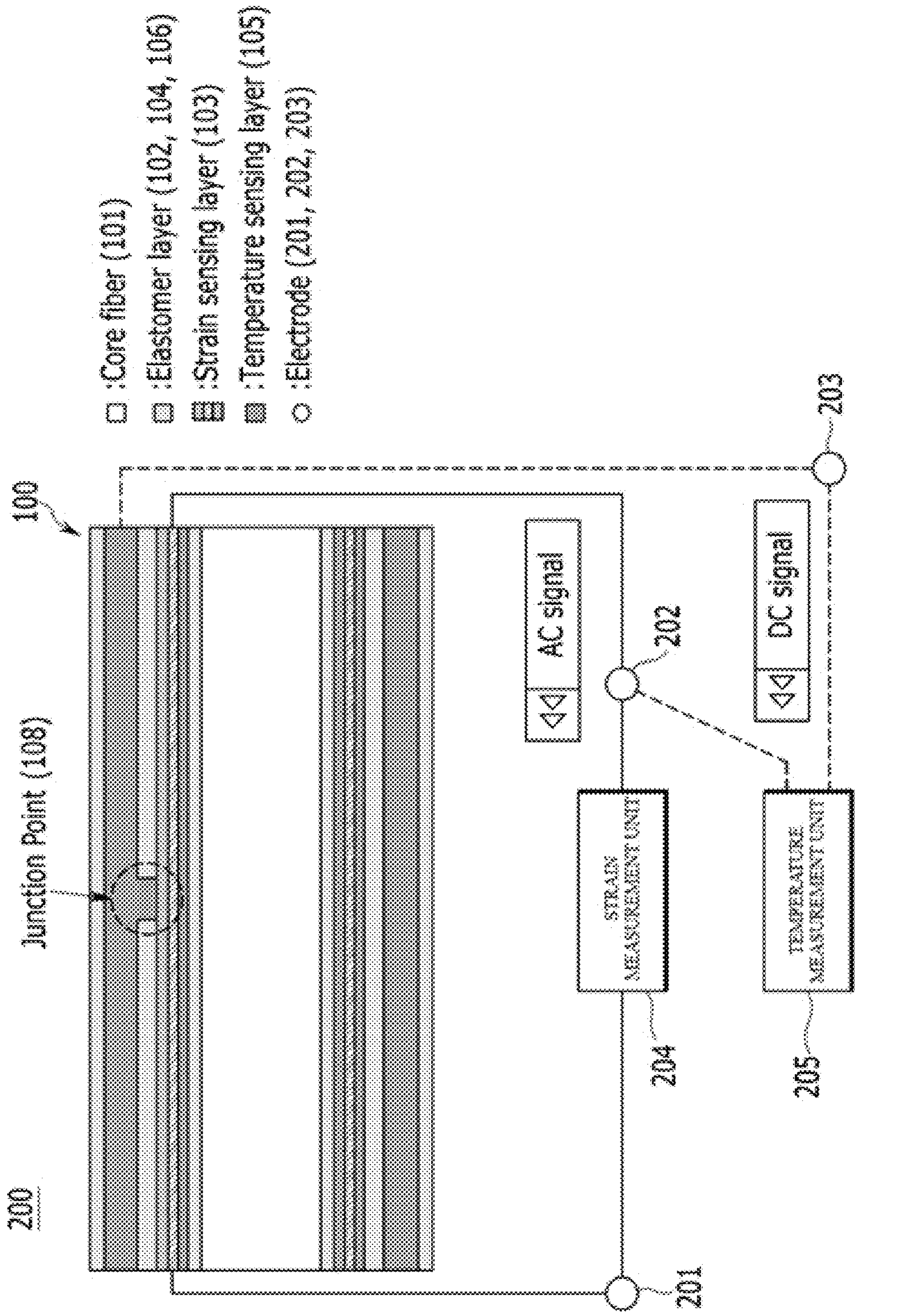
FIG. 3 is a view illustrating a configuration of a measurement system of a dual-mode coaxial fiber sensor according to an embodiment.

FIG. 3 is a view illustrating a configuration of a measurement system of a dual-mode coaxial fiber sensor according to an embodiment.

Referring to FIG. 3, a measurement system 200 may include a dual-mode coaxial fiber sensor 100, a plurality of electrodes 201, 202, and 203, a strain measurement unit 204, and a temperature measurement unit 205.

The measurement system 200 may simultaneously measure a strain and a temperature using only a plurality of electrodes, that is, three electrodes 201, 202, and 203.

One end of a first electrode 201 among the plurality of electrodes 201, 202, and 203 is connected to a strain sensing layer 103, and the other end thereof is connected to the strain measurement unit 204.

One end of a second electrode 202 is connected to the strain sensing layer 103, and the other end thereof is connected to the strain measurement unit 204.

When the strain sensing layer 103 is deformed due to external loads such as tension, compression, and impact, an electrical network is changed to cause a resistance change between the first electrode 201 and the second electrode 202.

In this case, the strain measurement unit 204 may measure a strain occurring in the strain sensing layer 103 by measuring the resistance change between the first electrode 201 and the second electrode 202.

The temperature measurement unit 205 is connected to the second electrode 202 and a third electrode 203. One end of the third electrode 203 is connected to the temperature measurement unit 205, and the other end thereof is connected to a temperature sensing layer 105.

In this case, a junction point 108 is formed in a slit 107 between the strain sensing layer 103 and the temperature sensing layer 105.

When a temperature of the temperature sensing layer 105 changes, a temperature difference occurs between the temperature sensing layer 105 and the strain sensing layer 103, and the temperature difference changes an electrical network to generate a thermoelectric effect in the junction point 108.

In this case, the temperature measurement unit 205 may measure a thermoelectric voltage between the second electrode 202 connected to one end of the junction point 108 and the third electrode 203 connected to the other end of the junction point 108 and may convert the measured thermoelectric voltage into a temperature to measure a temperature.

In this way, through the structure of the dual-mode coaxial fiber sensor 100 according to an embodiment of the present disclosure, in addition to strain measurement, temperature measurement is possible at the same time by measuring a thermoelectric voltage at the junction point 108.

In addition, when a thermoelectric voltage is measured, since the second electrode 202 is shared and used, the structure can be simplified. The simplified structure provides an effect of reducing manufacturing costs.

Figure 4:
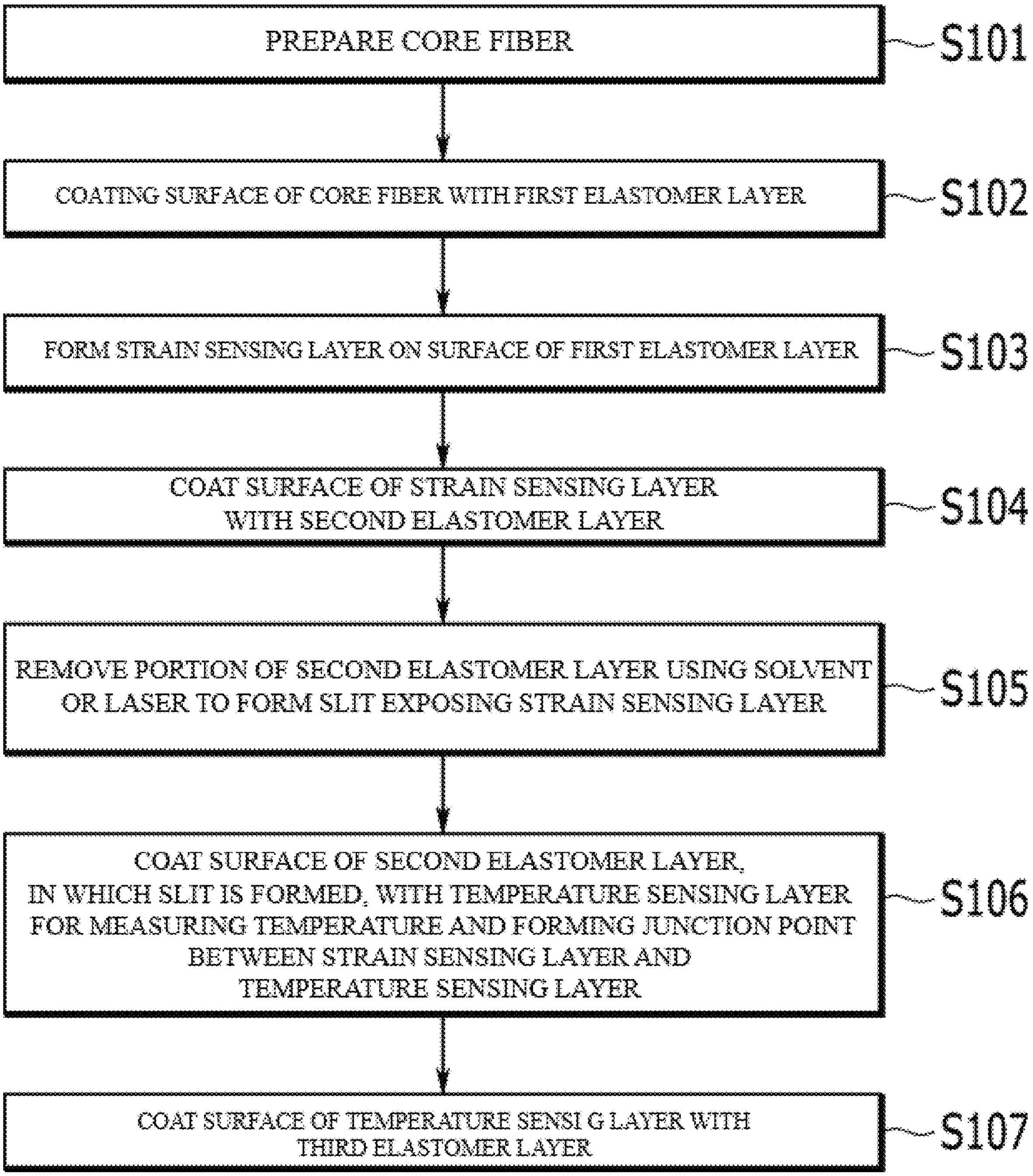
FIG. 4 is a flowchart for describing a process of manufacturing a dual-mode coaxial fiber sensor according to an embodiment.
Figure 5:
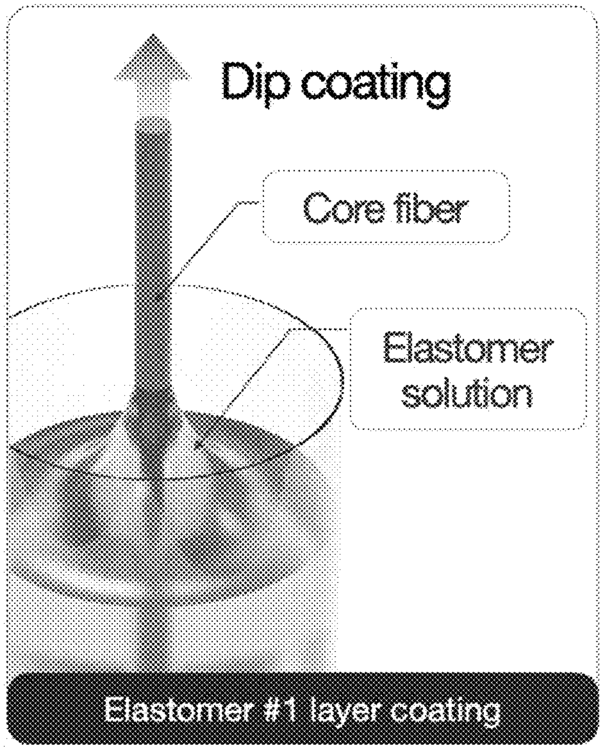
FIG. 5 is an exemplary view for describing a process of forming a first elastomer layer according to an embodiment.
Figure 6:
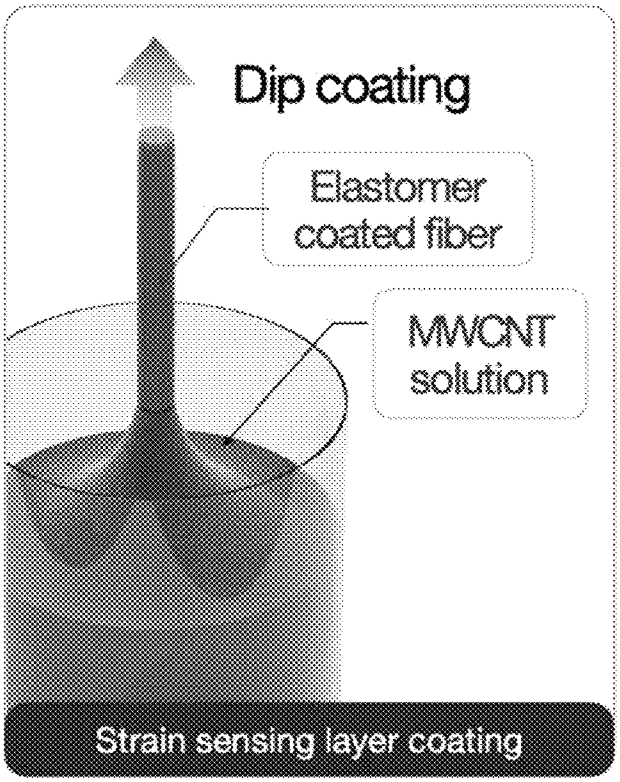
FIG. 6 is an exemplary view for describing a process of forming a strain sensing layer according to an embodiment.
Figure 7:
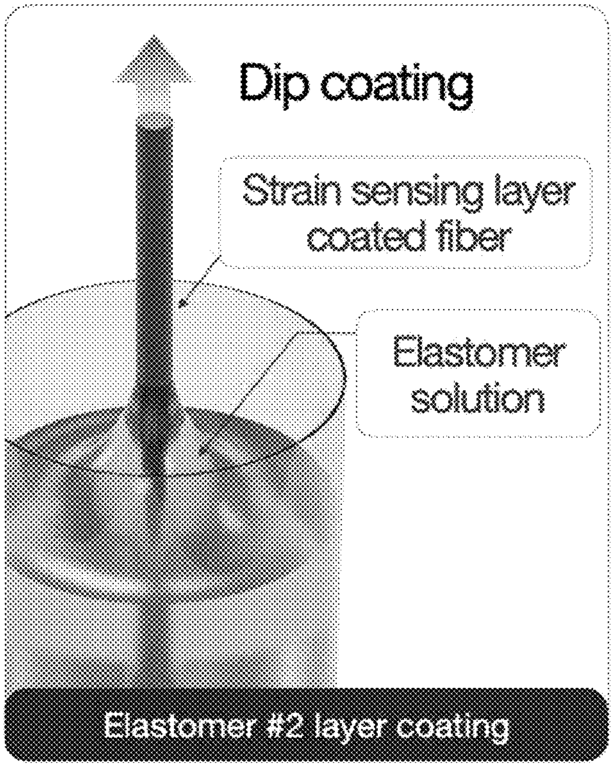
FIG. 7 is an exemplary view for describing a process of forming a second elastomer layer according to an embodiment.
Figure 8:
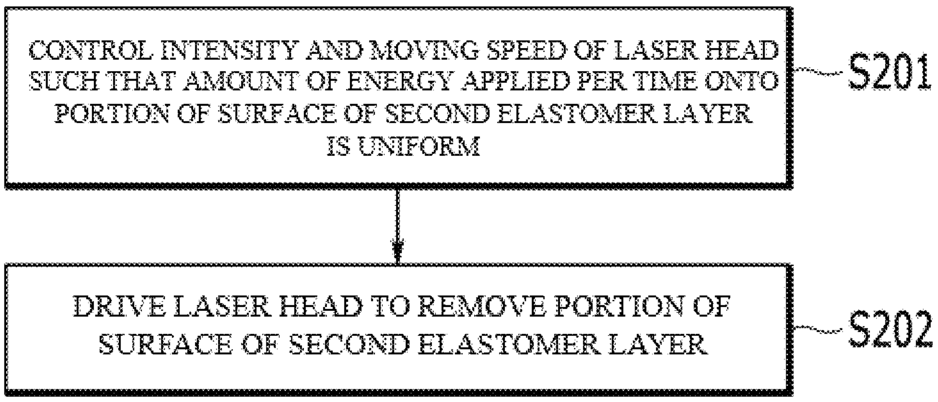
FIG. 8 is a flowchart for describing a process of manufacturing a junction point by forming a slit between a strain sensing layer and a temperature sensing layer according to an embodiment.
Figure 9:
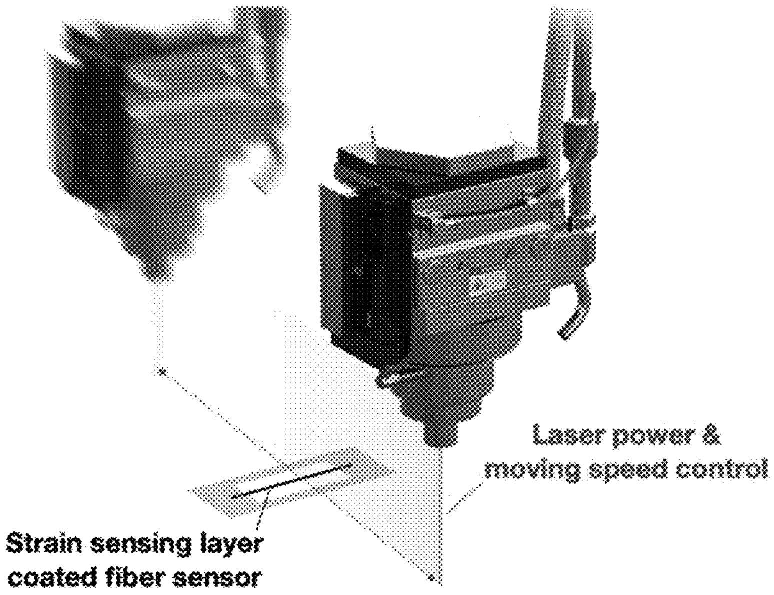
FIG. 9 is an exemplary view for describing the driving of a laser for manufacturing the junction point of FIG. 8.
Figure 10:
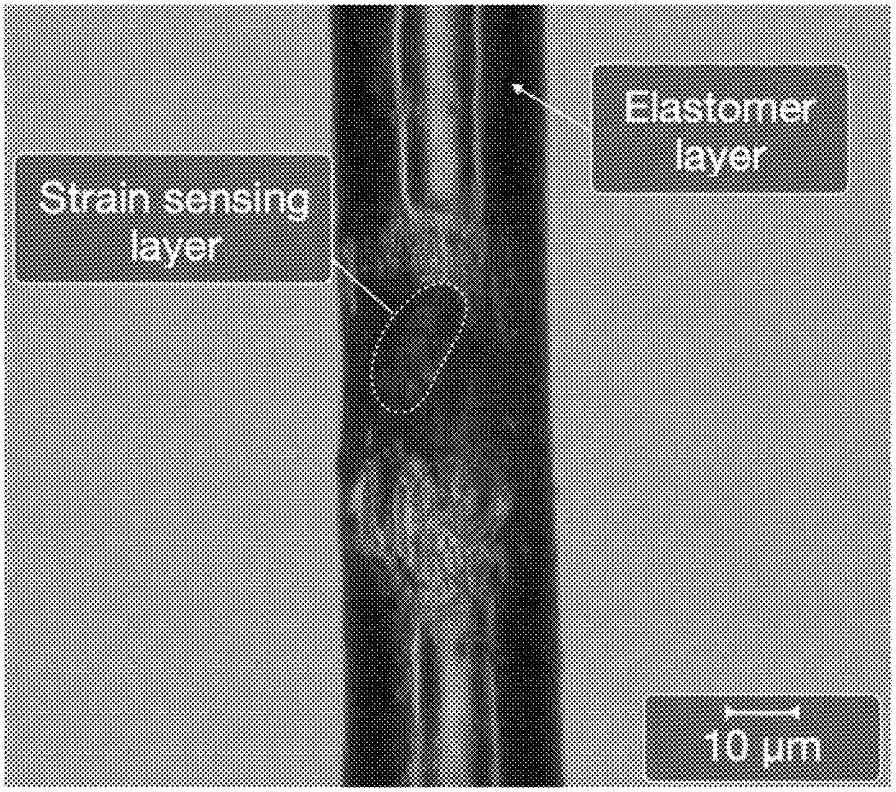
FIG. 10 is an exemplary view illustrating a strain sensing layer exposed to the outside through the formation of the slit of FIG. 8.
Figure 11:
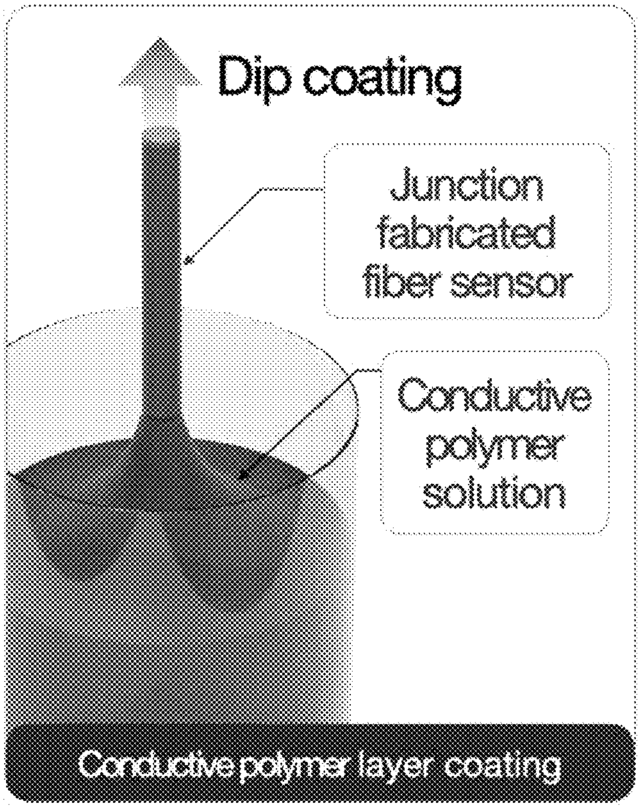
FIG. 11 is an exemplary view for describing a process of forming a temperature sensing layer according to an embodiment.
Figure 12:
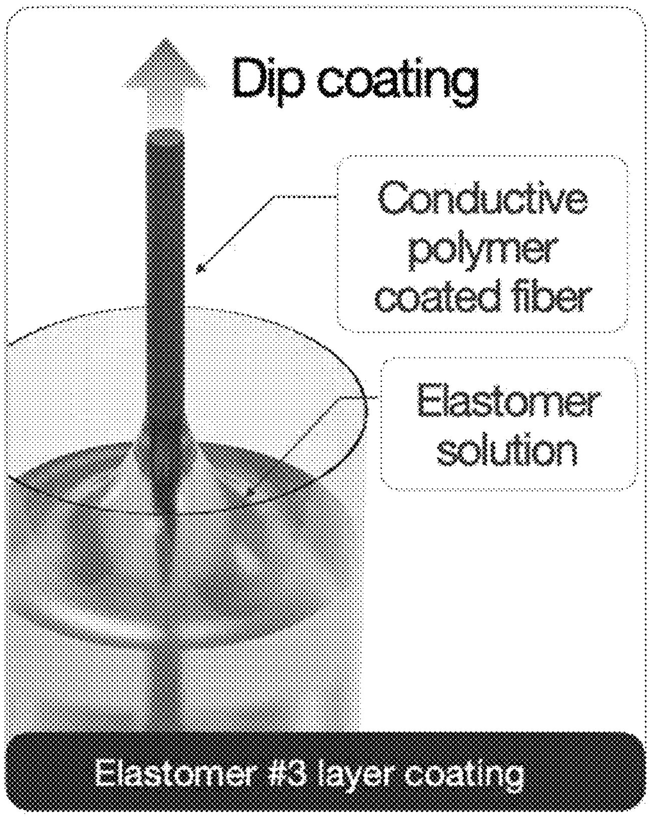
FIG. 12 is an exemplary view for describing a process of forming a third elastomer layer according to an embodiment.

FIG. 4 is a flowchart for describing a process of manufacturing a dual-mode coaxial fiber sensor according to an embodiment. FIG. 5 is an exemplary view for describing a process of forming a first elastomer layer according to an embodiment. FIG. 6 is an exemplary view for describing a process of forming a strain sensing layer according to an embodiment, FIG. 7 is an exemplary view for describing a process of forming a second elastomer layer according to an embodiment. FIG. 8 is a flowchart for describing a process of manufacturing a junction point by forming a slit between a strain sensing layer and a temperature sensing layer according to an embodiment. FIG. 9 is an exemplary view for describing the driving of a laser for manufacturing the junction point of FIG. 8. FIG. 10 is an exemplary view illustrating a strain sensing layer exposed to the outside through the formation of the slit in FIG. 8. FIG. 11 is an exemplary view for describing a process of forming a temperature sensing layer according to an embodiment. FIG. 12 is an exemplary view for describing a process of forming a third elastomer layer according to an embodiment.

Referring to FIG. 4, first, a core fiber 101 is prepared (S101). Here, the core fiber 101 may be made of a UHMWPE material.

In operation S101, the core fiber may be prepared using a UHMWPE-based solution.

Next, a surface of the core fiber 101 is coated with a first elastomer layer 102 (S102).

In operation S102, referring to FIG. 5, dip coating may be performed by immersing the core fiber 101 in an elastomer solution. In this case, as the elastomer solution, an aqueous polyurethane coating solution may be used.

In operation S102, a process, in which the core fiber 101 is immersed in the elastomer solution and then taken out and dried in an oven at a temperature of 80° C. for 3 minutes, may be repeated three times to coat a surface of the core fiber 101 with the first elastomer layer 102.

Next, a strain sensing layer 103 for measuring a strain is formed on a surface of the first elastomer layer 102 (S103).

In operation S103, referring to FIG. 6, in order to impart measurement characteristics, that is, to form the strain sensing layer 103, dip coating may be performed by immersing the core fiber 101 coated with the first elastomer layer 102 in a multi-walled carbon nanotube (MWCNT) aqueous dispersion coating solution.

In operation S103, a process, in which the core fiber 101 coated with the first elastomer layer 102 is immersed in the MWCNT aqueous dispersion coating solution and then taken out and dried in an oven at a temperature of 80° C. for 3 minutes, is repeated three times, thereby forming the strain sensing layer 103 for measuring a strain on the surface of the first elastomer layer 102. Next, the strain sensing layer 103 is dried in an oven at a temperature of 80° C. for 1 hour to remove excess moisture.

Next, a surface of the strain sensing layer 103 is coated with a second elastomer layer 104 (S104).

In operation S104, referring to FIG. 7, dip coating may be performed by immersing the core fiber 101 coated with the first elastomer layer 102 and the strain sensing layer 103 in an elastomer solution. In this case, as the elastomer solution, an aqueous polyurethane coating solution may be used.

In operation S104, a process, in which the core fiber 101 coated with the first elastomer layer 102 and the strain sensing layer 103 is immersed in an aqueous polyurethane coating solution and then taken out and dried in an oven at a temperature of 80° C. for 3 minutes, is repeated three times, thereby coating the surface of the strain sensing layer 103 with a second elastomer layer 104.

Next, a portion of the second elastomer layer 104 is removed to form a slit 107 (S105), and a surface of the strain sensing layer 103 at the inside is exposed through the slit 107.

In operation S105, according to one embodiment, a solvent may be used to remove a portion of the second elastomer layer 104. As the solvent, at least one selected from ethyl alcohol, acetone, N,N-Dimethyl formamide, tetrahydrofuran, and butanone may be used.

In operation S105, according to another embodiment, a laser may be used to remove a portion of the second elastomer layer 104. As the laser, at least one selected from the group consisting of a $CO_2$ laser, a neodymium (Nd) laser, and a neodymium yttrium-aluminum-garnet (Nd:YAG) laser may be used.

In this case, the intensity and speed of a laser cutter may be adjusted to prevent the fracture of the strain sensing layer 103 and remove a portion of the second elastomer layer 104 to form the slit 107.

Since the second elastomer layer 104 is damaged when the laser is radiated directly onto a surface in a vertical direction, in order to remove only a portion of the surface while preventing damage, it is important to quickly control the speed of a laser head.

According to an embodiment, the intensity of a laser source may be adjusted to a power of 10 W to 40 W.

A moving speed of the laser head may be selected in a range of 40 mm/s to 50 mm/s.

Referring to FIGS. 8 and 9, the intensity and moving speed of the laser head are controlled such that an amount of energy applied per time onto a portion of a surface of the second elastomer layer 104 is uniform (S201), and the laser head is operated to remove a portion of the surface of the second elastomer layer 104 (S202).

Referring to FIG. 10, it can be seen that a portion of the surface of the second elastomer layer 104 is removed through the operation of the laser head, thereby partially exposing the strain sensing layer 103.

According to an experiment, the laser head may be adjusted at a power of 20 W and a moving speed of 46 mm/s to prevent the fracture of the second elastomer layer 104 and remove only a portion of the surface, thereby forming the slit 107.

Next, the surface of the second elastomer layer 104, in which the slit 107 is formed, is coated with a temperature sensing layer 105 for measuring a temperature, thereby forming a junction point 108 between the strain sensing layer 103 and the temperature sensing layer 105 (S106).

In operation S106, as shown in FIG. 11, a sensor 100 in which the slit 107 is formed may be coated with a conductive polymer solution to form the junction point 108 between the strain sensing layer 103 and the temperature sensing layer 105.

Here, as the conductive polymer solution, at least one selected from poly(3,4-ethylenedioxythiophene) polystyrene sulfonate (PEDOT:PSS), polypyrrole (PPY), polyaniline (PANI), and a silver nanowire dispersion solution may be used.

In operation S106, a process, in which the sensor 100 in which the slit 107 is formed is immersed in a PEDOT:PSS coating solution and then dried in an oven at a temperature of 80° C. for 3 minutes, may be repeated 15 times. Subsequently, the temperature sensing layer 105 may be dried in an oven at a temperature of 80° C. for 1 hour to remove excess moisture.

Finally, a surface of the temperature sensing layer 105 is coated with a third elastomer layer 106 (S107).

Referring to FIG. 12, a process, in which after the sensor 100 coated with the temperature sensing layer 105 is immersed in an elastomer solution and then immersed in an aqueous polyurethane coating solution, the sensor 100 is taken out and dried in an oven at a temperature of 80° C. for 3 minutes, is repeated three times, thereby coating the surface of the temperature sensing layer 105 with the third elastomer layer 106.

Through such a manufacturing process, a strain may be measured by measuring a resistance change according to the deformation of the sensor 100, and also a temperature may be measured at the same time by measuring a thermoelectric voltage generated at the junction point 108 between the strain sensing layer 103 and the temperature sensing layer 105.

In addition, in order to impart a strain measurement function, a shell, in which an elastomer layer and a multi-conductive layer coated with a conductive particle-based coating solution in a multi-layer structure are sequentially stacked, is formed on a surface of a polymer core fiber with high strength and rigidity. Thus, when the sensor 100 is used as an insertion type in a composite structure, a strain may be measured by measuring a resistance change of a conductive layer due to external loads such as tension, compression, and impact.

Hereinafter, the present disclosure will be described in detail through experimental examples. These experimental examples are only for illustrating the present disclosure, and the present disclosure is not limited thereto.

Experimental Examples

An experiment was performed to analyze a surface of a dual-mode coaxial fiber sensor 100 according to a junction fabrication process. The surface morphology and damage of a strain sensing layer 103 from which a portion of a second elastomer layer 104 was removed were examined using each of optical microscopy and Raman spectroscopy.

In order to examine the manufacturing of a junction point 108 and the effects of a temperature sensing layer 105 according to the junction fabrication process, an experiment was performed to analyze changes in resistance and measurement characteristics of the dual-mode coaxial fiber sensor 100. In this case, by using electronic test equipment, deformation sensitivity in various deformation ranges, that is, gauge factors, was measured, and cyclical testing was performed.

A thermoelectric voltage change was analyzed in various temperature and strain ranges.

Figure 13:
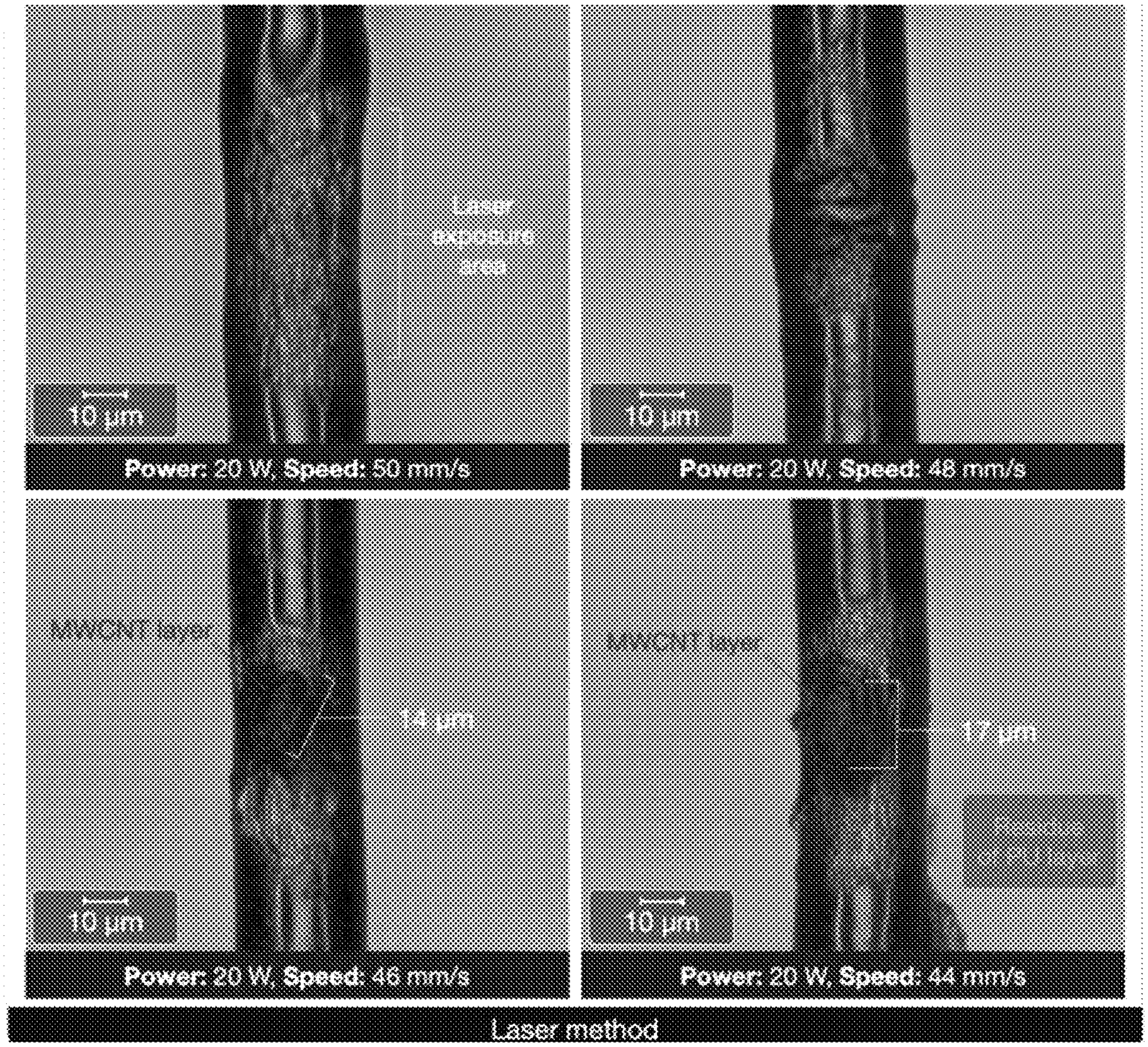
FIG. 13 illustrates a result of analyzing a surface of a dual-mode coaxial fiber sensor according to laser driving conditions.

First, FIG. 13 illustrates a result of analyzing the surface of the dual-mode coaxial fiber sensor according to laser driving conditions.

Referring to FIG. 13, the result of analyzing the surface after removing a portion of the second elastomer layer 104 by setting various laser operating conditions is shown.

Under the laser driving conditions, the intensity of a laser head was fixed at a power of 20 W, a moving speed of the laser head was changed, and a laser exposure area from which the second elastomer layer 104 was removed was analyzed. That is, the influence of a moving speed of a laser on the surface morphology and slit formation was analyzed.

The moving speed of the laser head was gradually reduced to 50 mm/s, 48 mm/s, 46 mm/s, and 44 mm/s, and thus a change in surface of the second elastomer layer 104 was analyzed.

As a result of the analysis, the surface of the second elastomer layer 104 became rough due to laser exposure, and a slit 107 was formed when the speed of the laser decreased from 50 mm/s to 42 mm/s.

When the moving speed of the laser head was greater than 50 mm/s, the surface morphology of the second elastomer layer 104 did not change, which seemed because energy is insufficient to remove the second elastomer layer 104.

In addition, when the moving speed of the laser head was less than 42 mm/s, the dual-mode coaxial fiber sensor 100 was damaged.

Therefore, it was confirmed that an appropriate speed of the laser at which the slit 107 could be formed and a surface was not damaged was in a range of 50 mm/s to 42 mm/s.

In this case, it can be confirmed that, from when the moving speed of the laser is 46 mm/s, a portion of the surface of the second elastomer layer 104 is removed and the strain sensing layer 103 at the inside is exposed. A size of the exposed portion was confirmed to be about 14 μm.

When the moving speed of the laser head was 44 mm/s, the size of the exposed portion was about 17 μm, and thus problems that the surface of the second elastomer layer 104 was excessively removed and a residue (outer polyurethane (PU) layer) remained on a surface of the sensor were confirmed.

Therefore, according to the experiment, it was confirmed that the moving speed of the laser head being set to 46 mm/s was an optimizing condition.

Figure 14:
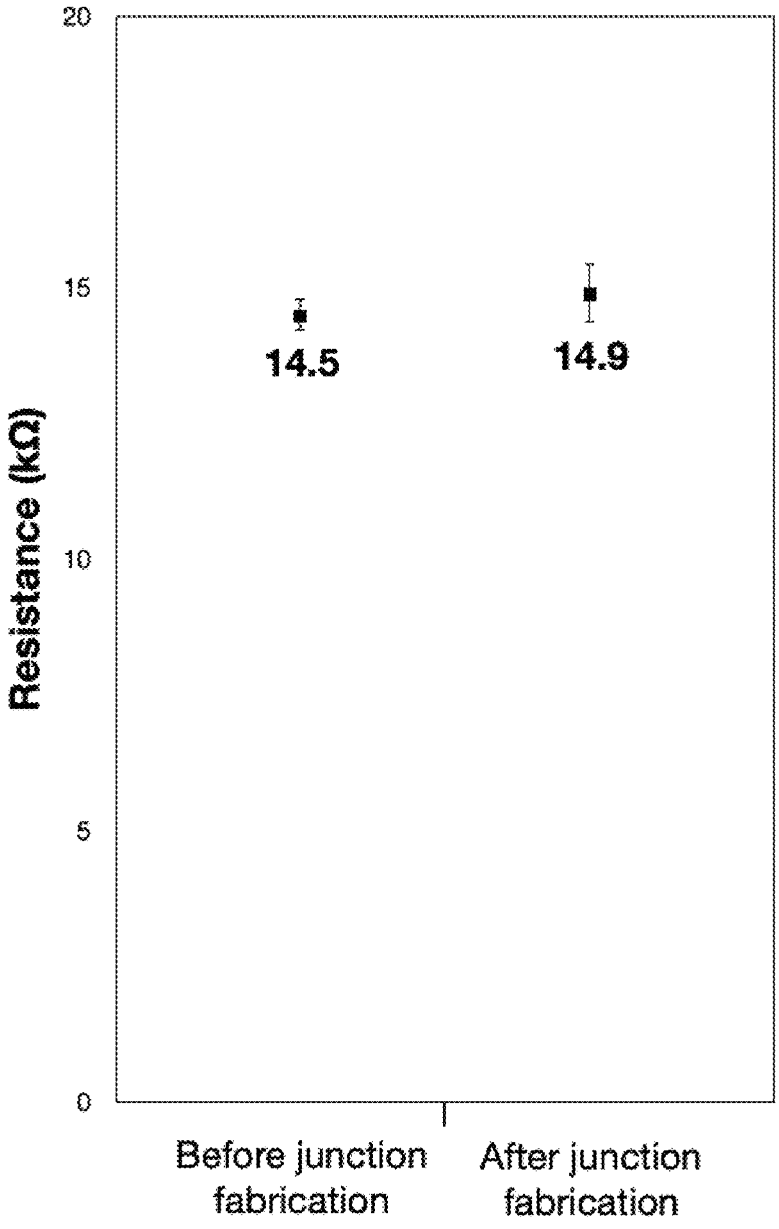
FIG. 14 shows the resistance characteristics of a dual-mode coaxial fiber sensor before and after a junction fabrication process.

FIG. 14 shows the resistance characteristics of the dual-mode coaxial fiber sensor before and after a junction fabrication process.

Referring to FIG. 14, as a result of measuring resistance of the sensor 100, average resistance before junction fabrication is 14.5 kΩ, and average resistance after junction fabrication is 14.9 kΩ. Therefore, even when the slit 107 was formed using a laser, since the average resistances before the junction fabrication was similar to the average resistance after the junction fabrication, it was confirmed that a laser process did not affect the strain sensing layer 103 at the inside.

Figure 15:
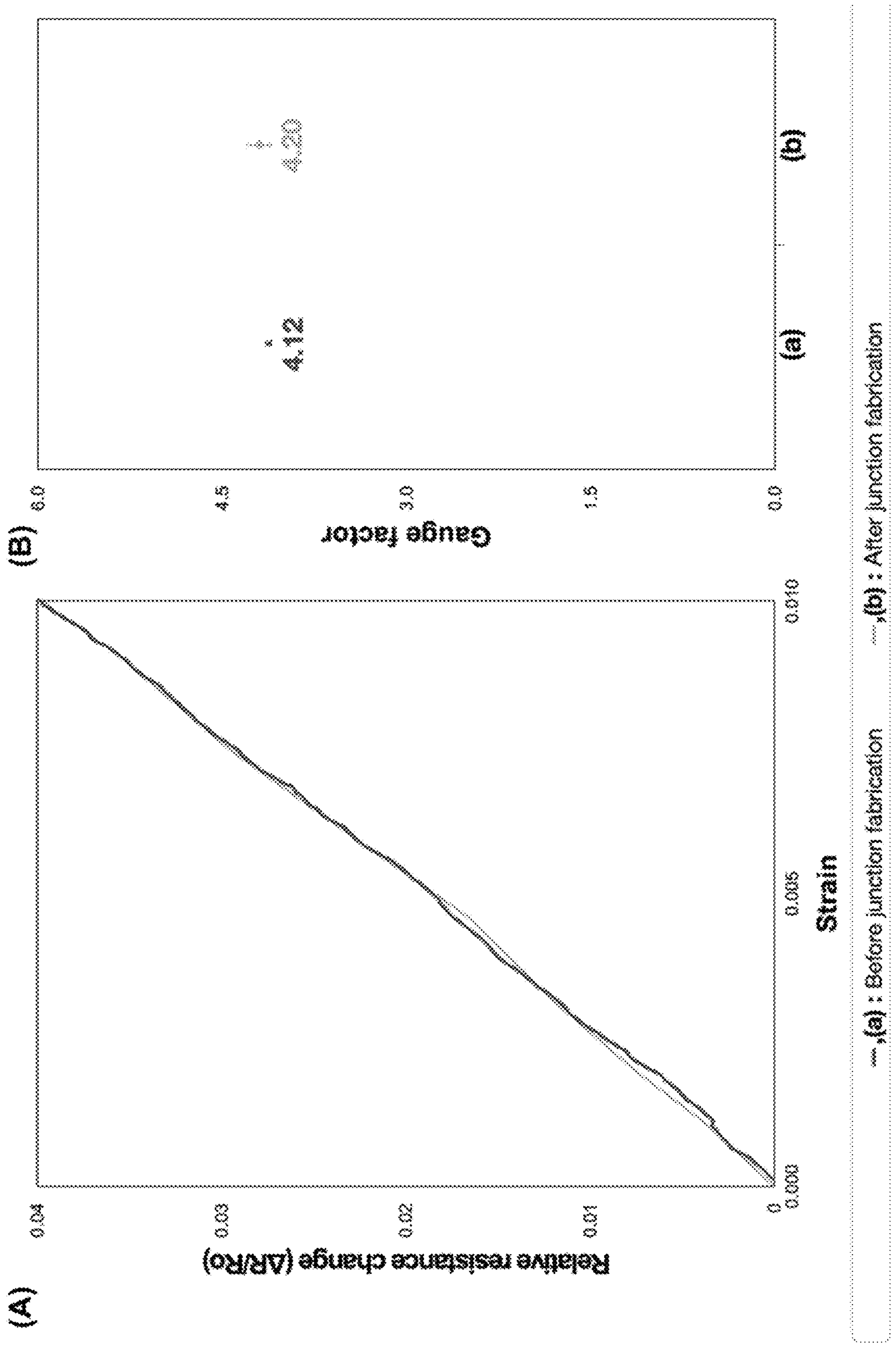
FIG. 15 shows the sensing response characteristics of the dual-mode coaxial fiber sensor according to junction fabrication.

FIG. 15 shows the sensing response characteristics of the dual-mode coaxial fiber sensor according to junction fabrication.

In this case, FIG. 15A shows the characteristics of a relative resistance change according to a strain, and FIG. 15B shows gauge factors before and after a junction fabrication process.

Referring to FIG. 15A, as a result of analyzing the measurement characteristics according to a strain, that is, as a result of analyzing a relative resistance change, it can be confirmed that linear response characteristics are maintained even after junction processing.

Referring to FIG. 15B, since the gauge factor before the junction fabrication (a) was 4.12, and the gauge factor after the junction fabrication was 4.20, it was confirmed that there was no significant change in the gauge factor even after the junction fabrication process.

Accordingly, through FIGS. 14 and 15, it can be confirmed that the strain sensing layer 103 is not degraded due to junction fabrication using a laser.

Next, an experiment was performed to evaluate the durability of the dual-mode coaxial fiber sensor 100.

Figure 16:
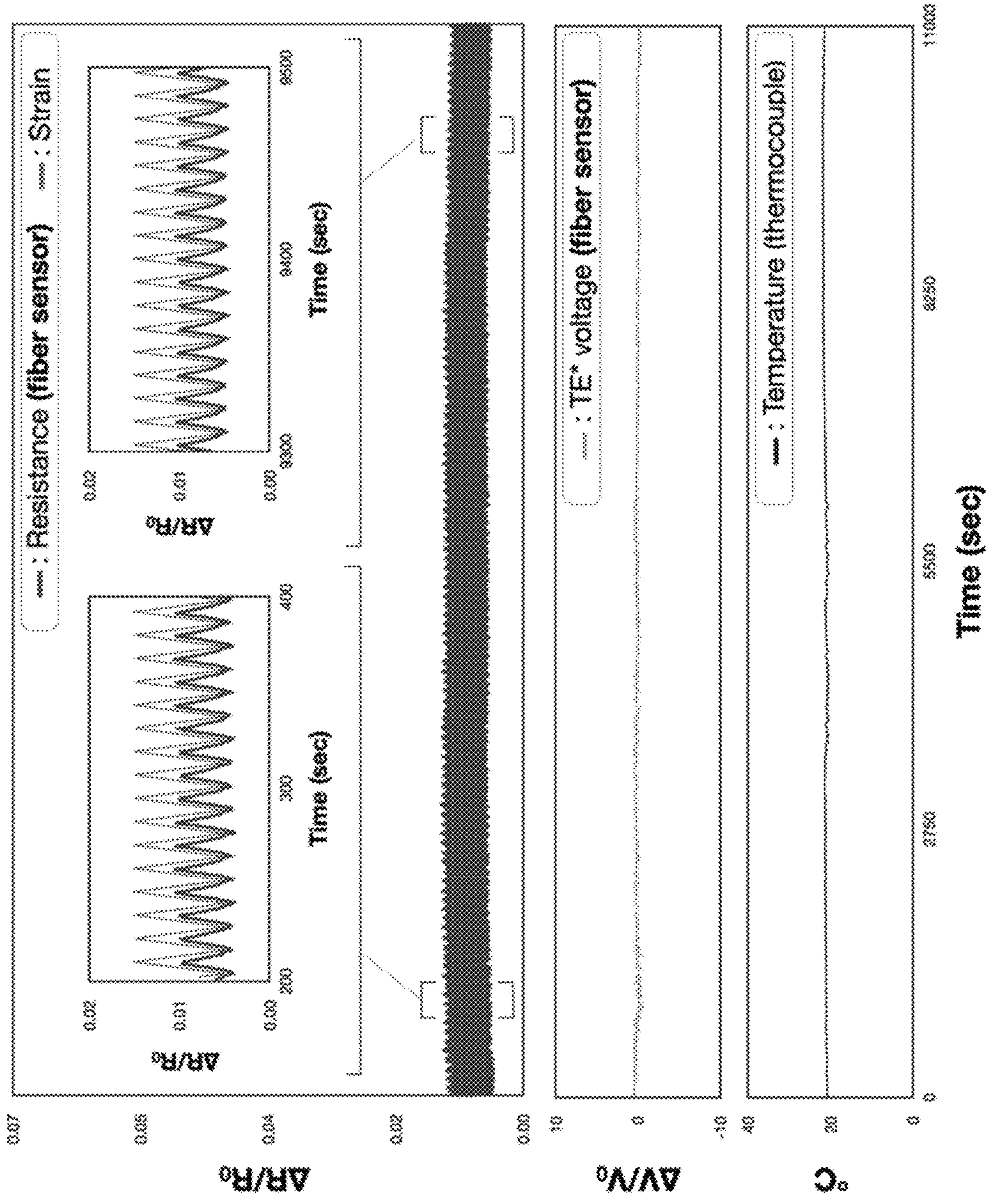
FIG. 16 shows sensing response characteristics according to 1,000 cycles.
Figure 17:
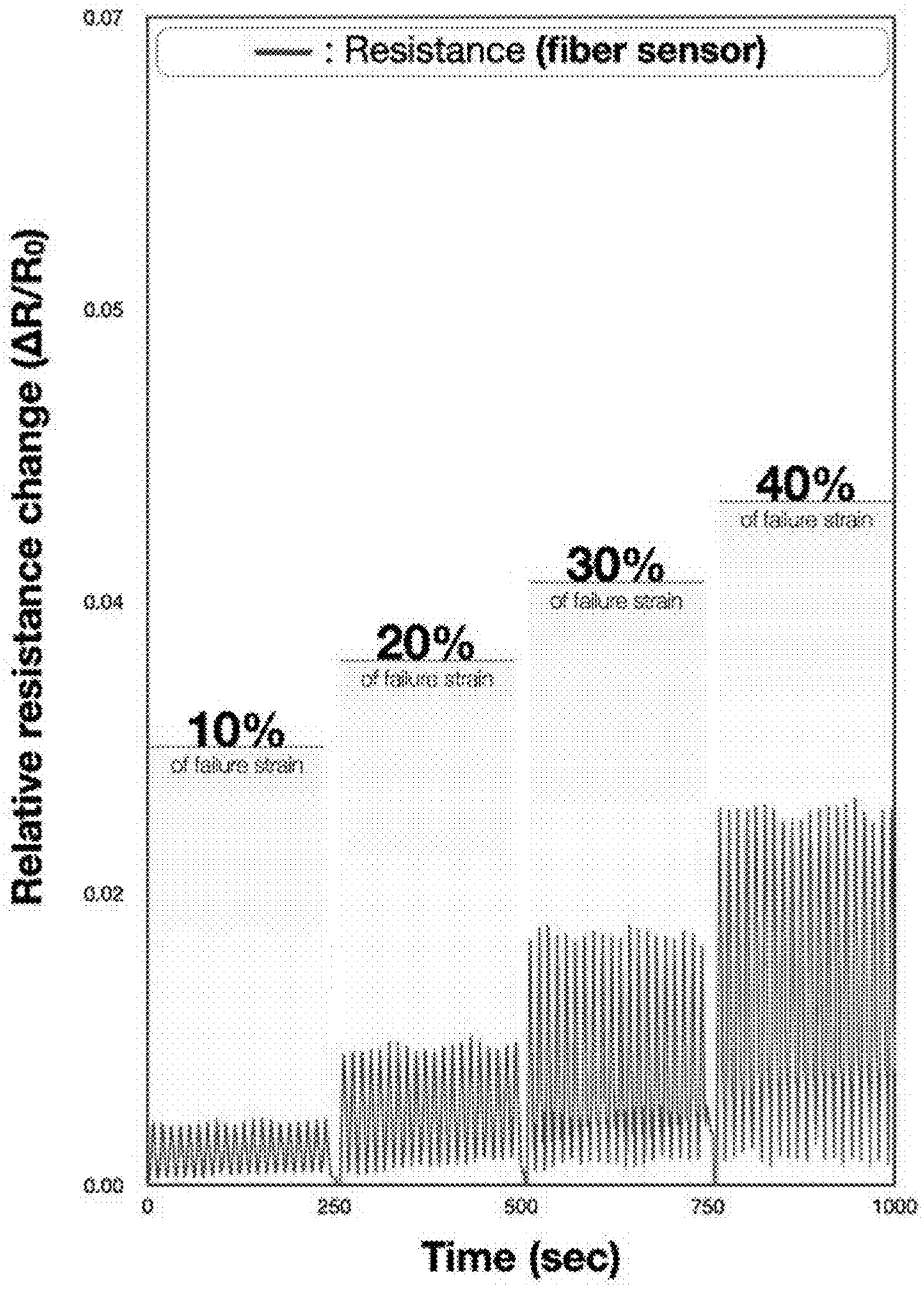
FIG. 17 shows the characteristics of a sensing response for a strain level.

FIG. 16 shows sensing response characteristics according to 1,000 cycles. FIG. 17 shows sensing response characteristics for a strain level, in particular, the characteristics of time and relative resistance change for each strain level.

Referring to FIG. 16, evaluation results of repeatability of the dual-mode coaxial fiber sensor 100 are shown. As a result of analyzing a sensing response according to 1,000 cycles, it was confirmed that both a resistance change and a thermoelectric voltage were stably measured from the strain sensing layer 103 for 1,000 cycles or more.

The reason why the cyclical stability of the dual-mode coaxial fiber sensor 100 is maintained is because even though the slit 107 is formed in a second elastomer layer 104, a portion corresponding to the slit 107 is coated with the temperature sensing layer 105. In addition, a third elastomer layer 106 can prevent physical damage to the temperature sensing layer 105 and the junction point 108.

Then, even when an experiment was performed by gradually increasing a magnitude of an applied strain to 10%, 20%, 30%, and 40% of the breaking elongation of the dual-mode coaxial fiber sensor 100, it was confirmed through FIG. 17 that stable measurement was possible.

Referring to FIG. 17, it was confirmed that when a failure strain was set to various ranges of 10% to 40%, resistance changes could be measured stably in various strain ranges without degradation.

As a result, even when the slit 107 was formed in the second elastomer layer 104 through laser processing, since a portion of the slit 107 was filled with the temperature sensing layer 105, and also the third elastomer layer 106 was formed on the outermost layer, it could be confirmed that repeat measurement stability was maintained.

Figure 18:
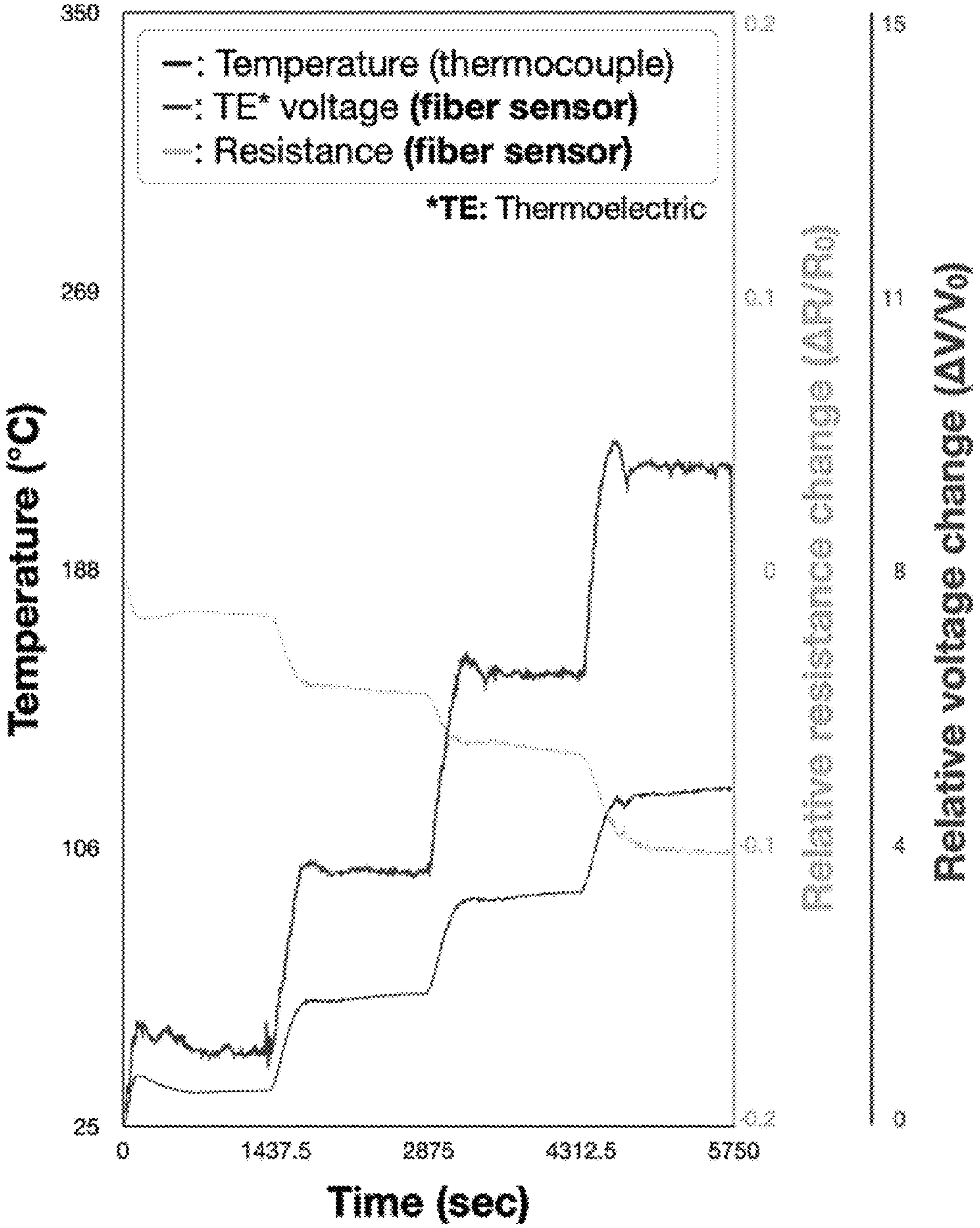
FIG. 18 shows a result of analyzing measurement characteristics of a temperature according to a time in a dual-mode coaxial fiber sensor.

FIG. 18 shows a result of analyzing measurement characteristics of a temperature according to a time in the dual-mode coaxial fiber sensor.

Referring to FIG. 18, when a signal detected from the dual-mode coaxial fiber sensor 100 was measured by increasing a temperature by 30° C. from 0° C. to 125° C., it was confirmed that a thermoelectric voltage (TE* voltage) and resistance which represents a strain were measured stably according to temperature cycles.

Therefore, it can be confirmed that a strain and a temperature can be measured simultaneously only with a dual-mode coaxial fiber type sensor, that is, a single sensor, without a separate temperature measurement sensor.

According to the present disclosure, it is possible to manufacture a fiber sensor capable of simultaneously measuring a temperature and a strain using a single sensor. Therefore, when the sensor is used as an insertion type inside a composite material, there is an advantage in that there is no need to embed a separate temperature measurement sensor to compensate for a strain error according to a temperature change. Therefore, as compared to existing optical fiber sensor-based strain monitoring systems, the fiber sensor can measure a strain stably without acting as a defect in a composite material structure.

Although the embodiments of the present disclosure have been described in detail, the scope of the present disclosure is not limited thereto, but various modifications and improvements made by those skilled in the art using the basic concept of the present disclosure defined in the claims also fall within the scope of the present disclosure.

What is claimed is:

1. A dual-mode coaxial fiber sensor comprising:

a core fiber; and a plurality of coating layers sequentially stacked on the core fiber, wherein the plurality of coating layers include:

a strain sensing layer formed on the core fiber and made of a conductive material; and a temperature sensing layer formed on the strain sensing layer and made of a conductive material, wherein the plurality of coating layers further include an elastomer layer with which a surface of the strain sensing layer is coated, and the temperature sensing layer is formed on the elastomer layer, and wherein a portion of the strain sensing layer is exposed through a slit formed in a portion of a surface of the elastomer layer to form a junction point between the strain sensing layer and the temperature sensing layer, and the dual-mode coaxial fiber sensor has a structure capable of measuring a temperature by measuring a thermoelectric voltage generated at the junction point.

2. The dual-mode coaxial fiber sensor of claim 1, wherein the slit is formed using a solvent or a laser.

3. The dual-mode coaxial fiber sensor of claim 2, wherein the slit is formed through an intensity and a moving speed of the laser which are set such that the elastomer layer is not damaged.

4. The dual-mode coaxial fiber sensor of claim 1, wherein the plurality of coating layers further include an elastomer layer with which a surface of the temperature sensing layer is coated.

5. The dual-mode coaxial fiber sensor of claim 4, wherein the plurality of coating layers further include an elastomer layer with which a surface of the core fiber is coated, and the strain sensing layer is formed on a surface of the elastomer layer formed on the surface of the core fiber.

6. A method of manufacturing a dual-mode coaxial fiber sensor, the method comprising:

preparing a core fiber for a dual-mode coaxial fiber sensor;

coating the core fiber with a strain sensing layer made of a conductive material;

coating the strain sensing layer with an elastomer layer;

removing a portion of a surface of the elastomer layer to form a slit exposing a portion of the strain sensing layer; and coating the elastomer layer with a temperature sensing layer, wherein a junction point is formed between the strain sensing layer and the temperature sensing layer through the slit, and a temperature is measured through a thermoelectric voltage measured at the junction point.

7. The method of claim 6, further comprising, after the coating with the temperature sensing layer, coating a surface of the temperature sensing layer with an elastomer layer.

8. The method of claim 7, further comprising, between the preparing and the coating with the strain sensing layer, coating a surface of the core fiber with an elastomer layer.

9. The method of claim 6, wherein the coating with the temperature sensing layer includes coating the elastomer layer with a conductive polymer solution using a dip coating method, wherein the conductive polymer solution includes at least one selected from poly(3,4-ethylenedioxythiophene) polystyrene sulfonate (PEDOT:PSS), polypyrrole (PPY), polyaniline (PANI), and a silver nanowire dispersion solution.

10. The method of claim 6, wherein the forming of the slit includes removing a portion of a surface of the elastomer layer using a solvent or a laser.

11. The method of claim 10, wherein the solvent includes at least one selected from ethyl alcohol, acetone, N,N-Dimethyl formamide, tetrahydrofuran, and butanone.

12. The method of claim 10, wherein the laser includes at least one selected from a $CO_2$ laser, a neodymium (Nd) laser, and a neodymium yttrium-aluminum-garnet (Nd:YAG) laser.

13. The method of claim 10, wherein the forming of the slit includes forming the slit by adjusting a cutter intensity of the laser and a moving velocity of a laser head.

14. A measurement system comprising:

a dual-mode coaxial fiber sensor in which a core fiber, a strain sensing layer, an elastomer layer, and a temperature sensing layer are sequentially stacked and in which a portion of the surface of the elastomer layer is removed to form a slit exposing a portion of the strain sensing layer;

a strain measurement unit connected to the strain sensing layer and configured to measure a resistance change according to deformation of the strain sensing layer; and a temperature measurement unit which is connected to the temperature sensing layer, when a temperature change occurs in the temperature sensing layer, measures a thermoelectric voltage generated at a junction point in the slit between the temperature sensing and the strain sensing layer due to a temperature difference between the temperature sensing layer and the strain sensing layer, and measures a temperature from the thermoelectric voltage.

15. The measurement system of claim 14, further comprising a first electrode and a second electrode, each having one end connected to the strain sensing layer and the other end connected to the strain measurement unit, wherein the strain measurement unit measures resistance between the first electrode and the second electrode and measures a strain from the measured resistance.

16. The measurement system of claim 15, further comprising a third electrode having one end connected to the temperature sensing layer and the other end connected to the temperature measurement unit, wherein the temperature measurement unit is connected to the second electrode and the third electrode, and when a temperature of the temperature sensing layer changes, measures a voltage generated at the junction point due to a temperature difference between the temperature sensing layer and the strain sensing layer through the second electrode and the third electrode.

* * * * *